United States Patent
Makii et al.

(10) Patent No.: US 7,388,718 B2
(45) Date of Patent: Jun. 17, 2008

(54) LENS HOLDING DEVICE, LENS-BARREL, AND IMAGING DEVICE

(75) Inventors: Tatsuo Makii, Tokyo (JP); Nobuaki Aoki, Tokyo (JP); Satoshi Imai, Kanagawa (JP); Hiroto Ogiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/549,745

(22) PCT Filed: Mar. 22, 2004

(86) PCT No.: PCT/JP2004/003869

§ 371 (c)(1),
(2), (4) Date: Nov. 10, 2006

(87) PCT Pub. No.: WO2004/088384

PCT Pub. Date: Oct. 14, 2004

(65) Prior Publication Data

US 2007/0053081 A1 Mar. 8, 2007

(30) Foreign Application Priority Data

Mar. 28, 2003 (JP) ............................. 2003-089711

(51) Int. Cl.
*G02B 15/14* (2006.01)
*G02B 7/02* (2006.01)

(52) U.S. Cl. ........................ 359/694; 359/819; 359/823

(58) Field of Classification Search ........ 359/694–701, 359/819–823
See application file for complete search history.

(56) References Cited

U.S. PATENT DOCUMENTS

| 4,534,624 | A * | 8/1985 | Toda et al. ................. 359/696 |
| 7,236,316 | B2 * | 6/2007 | Miki .......................... 359/819 |
| 2004/0051981 | A1 * | 3/2004 | Nomura ..................... 359/822 |

FOREIGN PATENT DOCUMENTS

| JP | 7-104166 | 4/1995 |
| JP | 9-292559 | 11/1997 |
| JP | 11-2858 | 1/1999 |
| JP | 2000-56387 | 2/2000 |
| JP | 2000-266982 | 9/2000 |
| JP | 2000-275494 | 10/2000 |

* cited by examiner

*Primary Examiner*—M. Hasan
(74) *Attorney, Agent, or Firm*—Oblon, Spivak, McClelland, Maier & Neustadt, P.C.

(57) ABSTRACT

A lens holder includes a third group frame that serves as a holding member which holds lenses, a guide shaft that supports the third group frame when the third group frame is moved along the optical axis of the lenses, a rear barrel part perpendicularly to which the guide shaft is locked, a first bearing member that is molded as an integral part of the rear barrel part in order to bear the end of the guide shaft distal to the rear barrel part, and a guide shaft presser that when the first bearing member bears the end of the guide shaft distal to the base, bears the end of the guide shaft proximal to the rear barrel part.

8 Claims, 13 Drawing Sheets

LENS HOLDING DEVICE, LENS-BARREL, AND IMAGING DEVICE

TECHNICAL FIELD

The present invention relates to a lens holder that holds lenses and supports the lenses so that the lenses can be moved along the optical axis of the lenses, and a lens barrel and an imaging apparatus that employ the lens holder.

BACKGROUND ART

In recent years, imaging apparatuses including a digital still camera and a digital video camera have been designed more and more compactly in pursuit of improved portability and better user-friendliness. Accordingly, a housing of an optical system or a lens barrel employed in the imaging apparatus has been designed more and more compactly. There is still an increasing demand for higher image quality and a larger number of pixels. Even if lenses that are optical elements are made larger in size, a driving mechanism is downsized in order to realize a compact housing of an optical system.

Moreover, a so-called collapsible lens barrel employed in an imaging apparatus such as a digital still camera or a digital video camera has been requested to become more compact and thin from the viewpoint of portability and accompanying usefulness. In particular, as for the digital still camera, articles resulting from the quest for further portability and accompanying usefulness such as articles capable of being put into a chest pocket of a shirt or a pocket of jeans are winning popularity nowadays. There is therefore a great demand for a thin housing of an optical system.

The so-called collapsible lens barrel has been disclosed in Japanese Unexamined Patent Publication No. 2002-296480, and the lens driving mechanism has been disclosed in Japanese Unexamined Patent Publication No. 2002-287002. In general, a guide shaft must be highly precisely positioned and locked in order to cramp movable lenses, which are incorporated in the collapsible lens barrel or a collapsible camera, so that the lenses can be moved in optical-axis directions, while highly precisely aligning the movable lenses with one another.

DISCLOSURE OF INVENTION

However, according to the foregoing related art, a plurality of pieces of positioning means, a plurality of pieces of locking means (securing elements or the like), and a plurality of bearing surfaces are needed in order to highly precisely position or lock a guide shaft presser in a rear barrel. This poses a problem in that the related art is unacceptable in terms of downsizing.

The present invention attempts to solve the above problem. Namely, the present invention provides a lens holder comprising: a holding member that holds lenses; a guide shaft that supports the holding member when the holding member is moved along the optical axis of the lenses; a base perpendicularly to which the guide shaft is locked; a first bearing member that is molded as an integral part of the base in order to bear the end of the guide shaft distal to the base; and a second bearing member that when the first bearing member bears the end of the guide shaft distal to the base, bears the end of the guide shaft proximal to the base. Moreover, the present invention provides a lens barrel and an imaging apparatus that employ the lens holder.

According to the present invention, when the guide shaft that supports movement of the lens holding member is rested perpendicularly to the base, since the first bearing member that bears the end of the guide shaft distal to the base is molded as an integral part of the base, the labor of mounting the first bearing member on the base becomes unnecessary. Consequently, a bearing member can be downsized and the precision in positioning a bearing can be improved.

BEST MODE FOR CARRYING OUT THE INVENTION

Figure 1A:
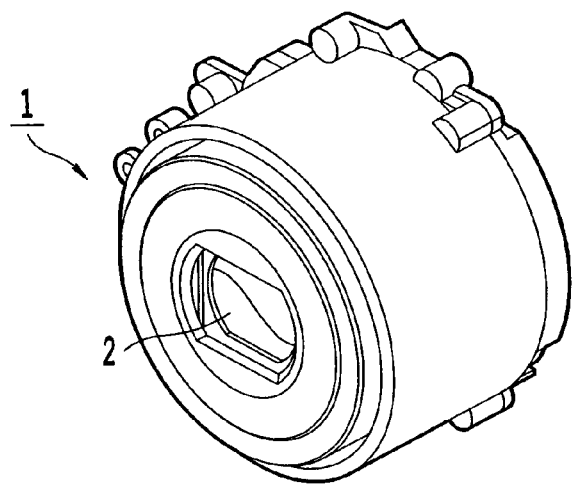
FIG. 1A to FIG. 1C are perspective views explanatory of the state of a collapsible lens barrel.
Figure 1B:
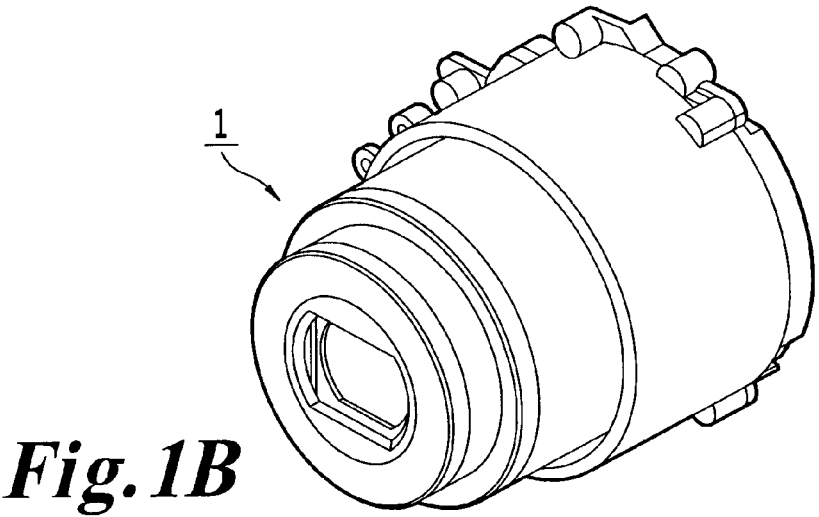
Figure 1C:
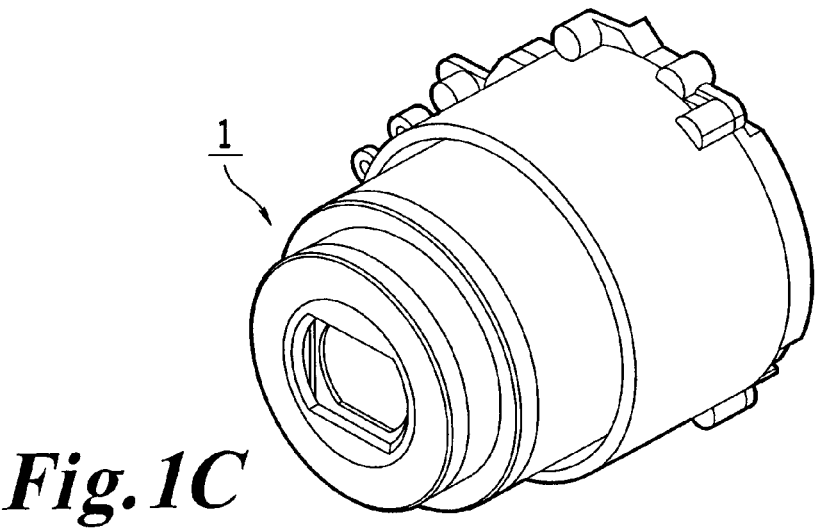
Figure 2A:
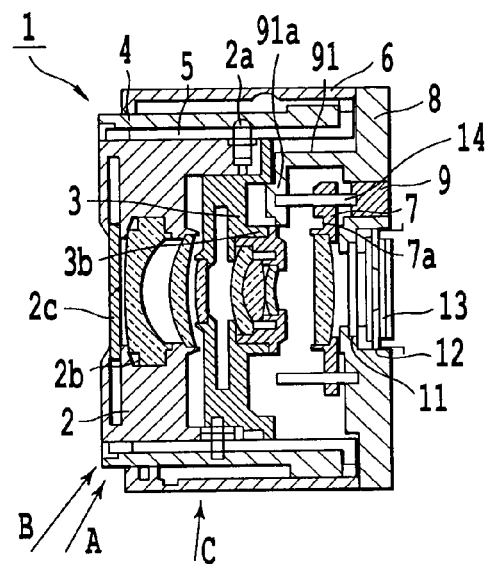
FIG. 2 includes sectional views of the collapsible lens barrel.
Figure 2B:
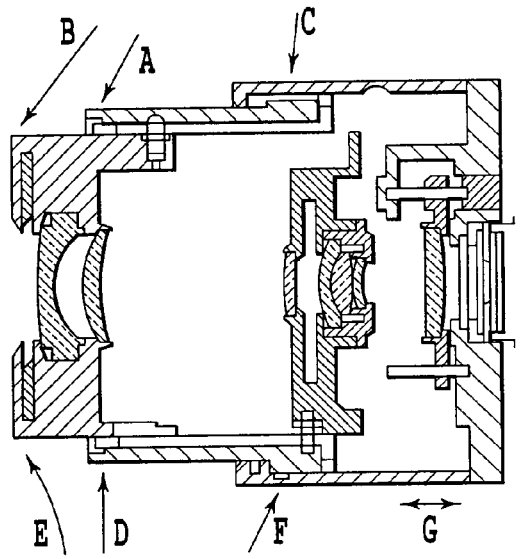
Figure 2C:
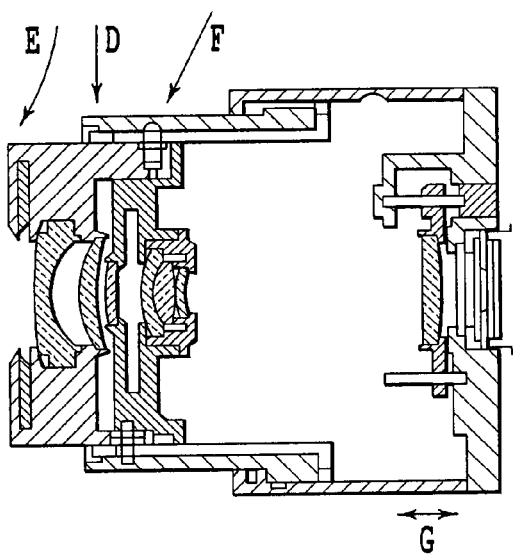
Figure 3:
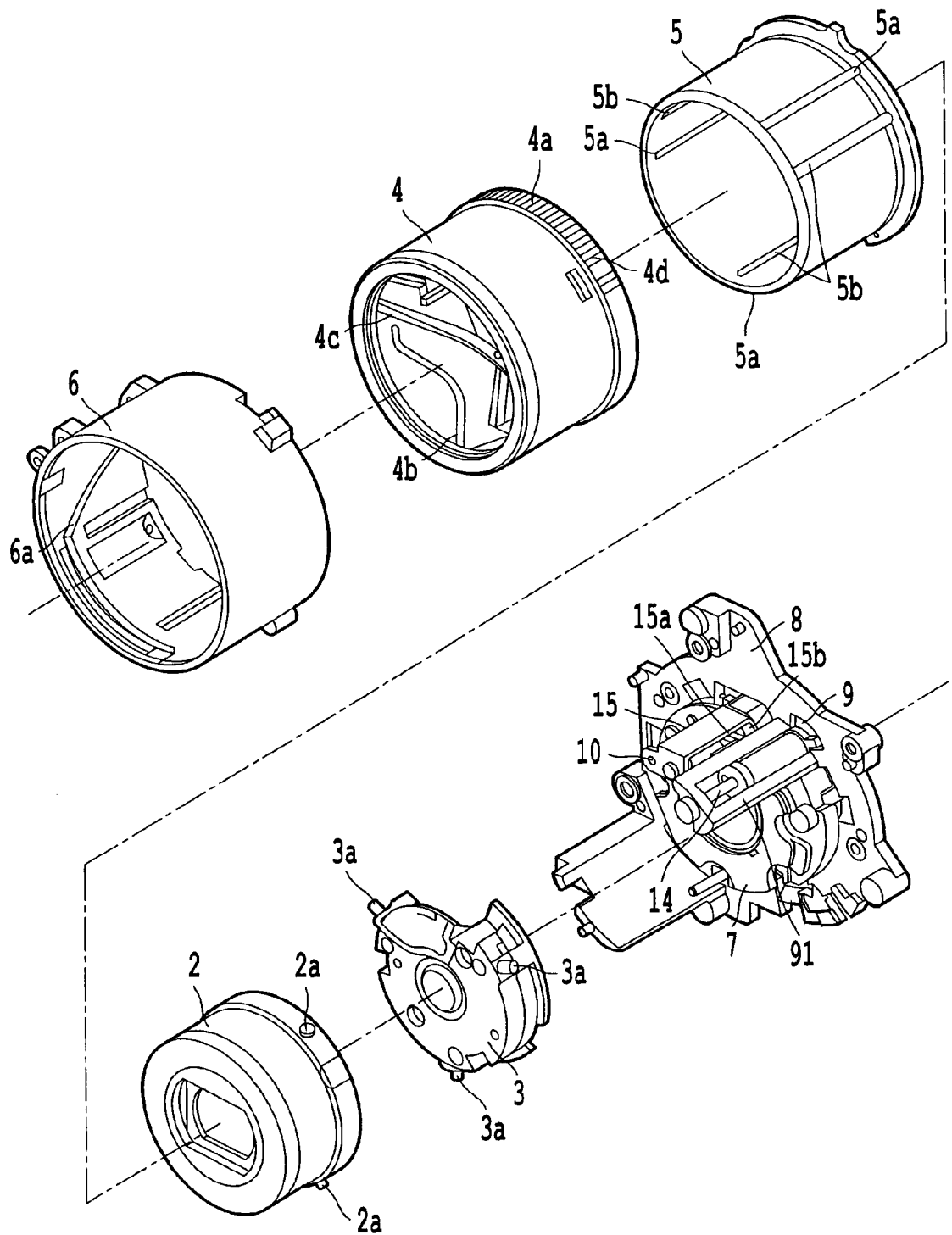
FIG. 3 is an exploded perspective view of the collapsible lens barrel.

Referring to the drawings, an embodiment of the present invention will be described below. To begin with, a lens barrel (collapsible lens barrel) to which a lens holder in accordance with the embodiment is adapted will be described below. FIG. 1A to FIG. 1C are perspective views explanatory of the state of a collapsible lens barrel. FIG. 1A shows a lens-stored state attained when the lens barrel is unused, that is, a collapsed state. FIG. 1B shows a wide-angle state, and FIG. 1C shows a telephoto state. FIG. 2 includes sectional views of the collapsible lens barrel. In FIG. 2, (a) shows the collapsed state, (b) shows the wide-angle state, and (c) shows the telephoto state. FIG. 3 is an exploded perspective view of the collapsible lens barrel.

A collapsible lens barrel 1 is optically composed of three groups of lenses. The first and second groups of lenses are driven to move in an optical-axis direction as if to trace predetermined curves determined with the slides of predetermined cams, whereby zooming is achieved. The third group of lenses is inched in the optical-axis direction in order to achieve focusing. Namely, the first and second groups of lenses are displaced in order to vary a focal length, and the third group of lenses is displaced in order to appropriately focus the lenses on an object.

A first group frame 2 comprises three (a plurality of) cam pins 2a that are fitted in respective cam grooves 4b cut in a cam cylinder 4, a plurality of lens cells 2b in which the plurality of lenses belonging to the first group is inserted and locked, and a barrier mechanism 2c that protects the leading one of the group of lenses when the groups of lenses are stored or when the lens barrel is collapsed. The first group frame 2 is molded using, for example, a polycarbonate resin (black) that contains glass fibers, and is superior in strength, an ability to intercept light, and mass productivity.

A second group frame 3 comprises three (a plurality of) cam pins 3a that are fitted in respective cam grooves 4c cut in the cam cylinder 4, and a plurality of lens cells 3b in which a plurality of lenses belonging to the second group is inserted or locked. The second group frame 3 is molded using, for example, a polycarbonate resin (black) containing glass fibers, and is superior in strength, an ability to intercept light, and mass productivity. Moreover, the second group frame 3 may include an iris shutter mechanism.

The cam cylinder 4 comprises: a gear portion 4a that is driven by a gear unit 10 in order to rotate the cam cylinder 4 on the internal surface of a locking cylinder 6; three (a plurality of) cam grooves 4b in which the cam pins 2a projecting from the first group frame 2 are fitted; three (a plurality of) cam grooves 4c in which the cam pins 3a projecting from the second group frame 3 are fitted; and three (a plurality of) cam pins 4d fitted in a cam groove 6a cut in the locking cylinder 6. The cam cylinder 4 is molded using, for example, a polycarbonate resin (black) that contains glass fibers, and is superior in strength, an ability to intercept light, and mass productivity.

The can grooves 4b and cam grooves 4c allow the first and second groups of lenses to move in the optical-axis directions as if to trace predetermined curves, whereby a zooming movement is made. A rectilinear guide cylinder 5 is a member that is moved in the optical-axis directions together with the cam cylinder 4 on the internal surface of the locking cylinder 6. The rectilinear guide cylinder 5 comprises guide grooves 5a that guide the first group frame 2 in the optical-axis directions, and guide grooves 5b that guide the second group frame 3 in the optical-axis directions. The rectilinear guide cylinder 5 is molded using, for example, a polycarbonate resin (black) that contains glass fibers, and is superior in strength, an ability to intercept light, and mass productivity.

The locking cylinder 6 is a member fixed to a rear barrel part 8 and has three (a plurality of) cam grooves 6a in which the cam pins 4d projecting from the cam cylinder 4 are fitted. The locking cylinder 6 is molded using, for example, a polycarbonate resin (black) that contains glass fibers, and is superior in strength, an ability of intercept light, and mass productivity.

A third group frame 7 has lens cells 7a in which lenses belonging to the third group are inserted and locked. The third group frame 7 is molded using, for example, a polycarbonate resin (black) that contains glass fibers, and is superior in strength, an ability of intercept light, and mass productivity. The third group frame 7 is held on the rear barrel part 8 to be movable in the optical-axis directions. A power source such as a stepping motor 15 is used to inch the third group frame 7 in the optical-axis directions.

The third group frame 7 corresponds to a lens holding frame included in the present embodiment, and the rear barrel part 8 corresponds to a base included therein. A lens holder in accordance with the present embodiment will be described later. The locking cylinder 6, a guide shaft presser 9, and the gear unit 10 are positioned and locked in the rear barrel part 8.

The rear barrel part 8 has a concave part in which an optical low-pass cut filter, an infrared cut filter, or any other optical filter 11 is inserted, positioned, or locked, and a concave part in which a seal rubber 12 that prevents invasion of dust or the like into the inside of the barrel and elastically constrains the optical filter 11 to move is inserted. The rear barrel part 8 is molded using, for example, a polycarbonate resin (black) that contains glass fibers, and is superior in strength, an ability of intercept light, and mass productivity. A solid-state imaging device 13 such as a charge-coupled device (CCD) or a CMOS is highly precisely positioned and locked in the rear barrel part 8.

The gear unit 10 drives the cam cylinder 4 by applying a force to the gear portion 4a. The gear ratio is determined so that a sufficient driving force can be exerted in moving the groups of lenses from collapsed positions through wide-angle positions to telephoto positions or vice versa. The gear unit 10 drives the cam cylinder 4 so as to thus allow the collapsible lens barrel to make a zooming movement.

The stepping motor 15 comprises a lead screw 15a that is used to inch the third group frame 7 in the optical-axis directions, and a mounting plate 15b used to position or lock the stepping motor 15 in the rear barrel part 8.

The movements of the lenses will be described below. When the lenses are moved from their collapsed positions to their optical wide-angle positions, the gear unit 10 applies a driving force to the gear portion 4a of the cam cylinder 4 so as to drive the cam cylinder 4. The cam cylinder 4 is moved toward an object in the optical-axis direction while being rotated with the cam pins 4d slid along the cam grooves 6a cut in the locking cylinder 6. At this time, the rectilinear guide cylinder 5 is moved together with the cam cylinder 4 (see arrow A in FIG. 2).

At this time, the first group frame 2 is moved to trace a predetermined curve along with the slides of the cam pins 2a along the cam grooves 4b and the guide grooves 5a (see arrow B in FIG. 2). The second group frame 3 is moved to trace a predetermined curve along with the slides of the cam pins 3a along the cam grooves 4c and the guide grooves 5b (see arrow C in FIG. 2). Consequently, the first and second groups of lenses are moved to respective predetermined positions and thus located at the respective optical wide-angle positions.

Even when the groups of lenses are moved from their optical wide-angle positions to their optical telephoto positions, the gear unit 10 applies a driving force to the gear portion 4a of the cam cylinder 4 so as to drive the cam cylinder 4. The cam grooves 6a are formed so that when the groups of lenses are moved from their optical wide-angle positions to their optical telephoto positions, the cam cylinder 4 will not be driven in the optical-axis direction. At this time, the rectilinear guide cylinder 5 will not also be moved in the optical-axis direction (see arrow D in FIG. 2).

At this time, the first group frame 2 is moved to trace a predetermined curve along with the slides of the cam pins 2a along the cam grooves 4b and the guide grooves 5a (see arrow E in FIG. 2). The second group frame 3 is moved to trace a predetermined curve along with the slides of the cam pins 3a along the cam groove 4c and the guide grooves 5b (see arrow F in FIG. 2). Consequently, the first and second groups of lenses are moved to trace the predetermined curves between their optical wide-angle positions and their telephoto positions. Thus, the collapsible lens barrel makes a zooming movement.

When the groups of lenses are moved from the respective optical telephoto positions through the respective optical wide-angle positions to the respective collapsed positions, the gear unit 10 is driven in an opposite direction in order to rotate the cam cylinder 4 in an opposite direction. When the cam cylinder 4 is driven by the gear unit 10, the collapsible lens barrel 1 makes a collapsing movement or a zooming movement. When the third group of lenses is inched in the optical-axis direction by means of the stepping motor 15 that is a drive source other than the gear unit, the collapsible lens barrel makes a focusing movement (see arrow G in FIG. 2).

Figure 4:
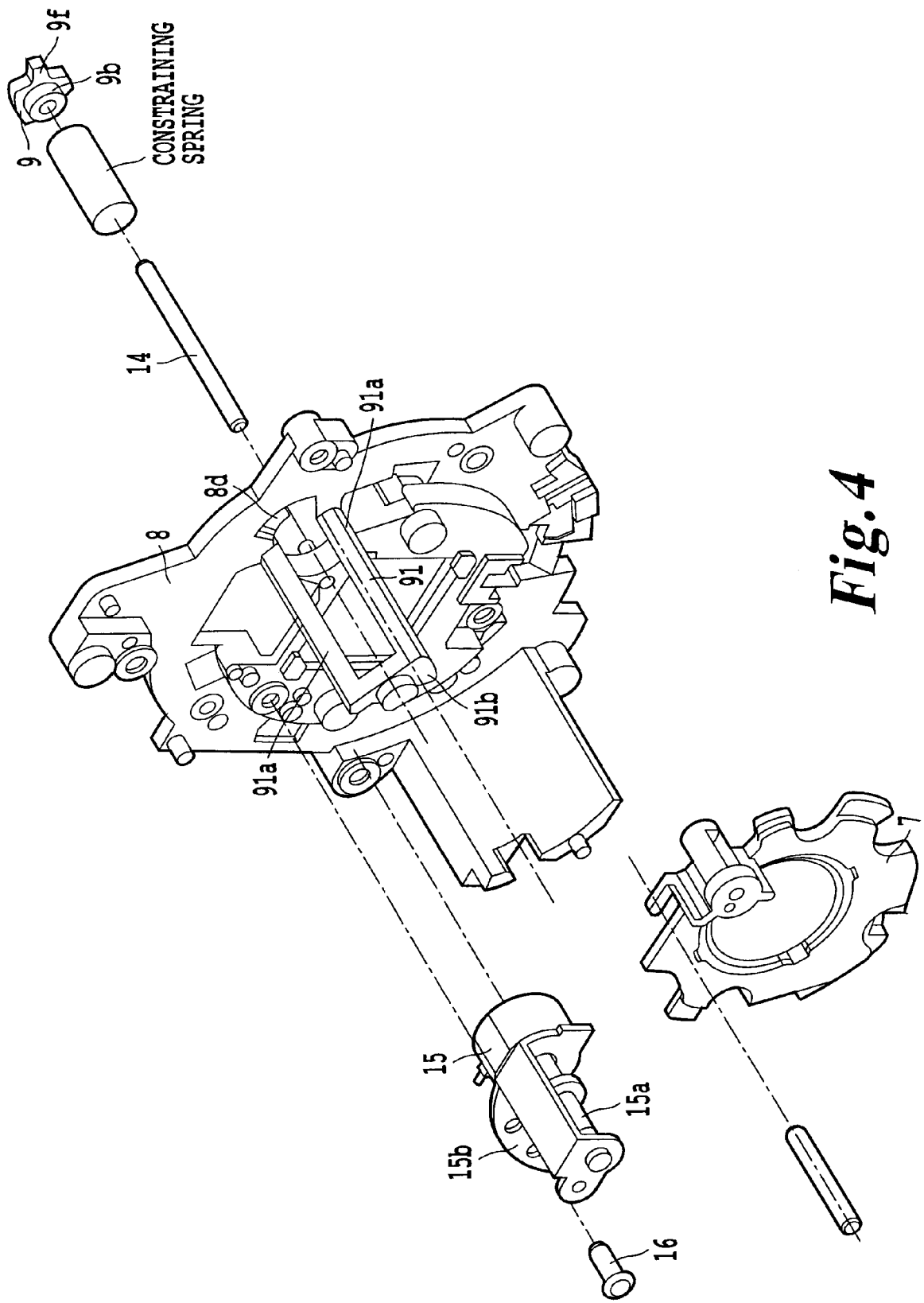
FIG. 4 is an exploded perspective view explanatory of a lens holder in accordance with an embodiment of the present invention.
Figure 5A:
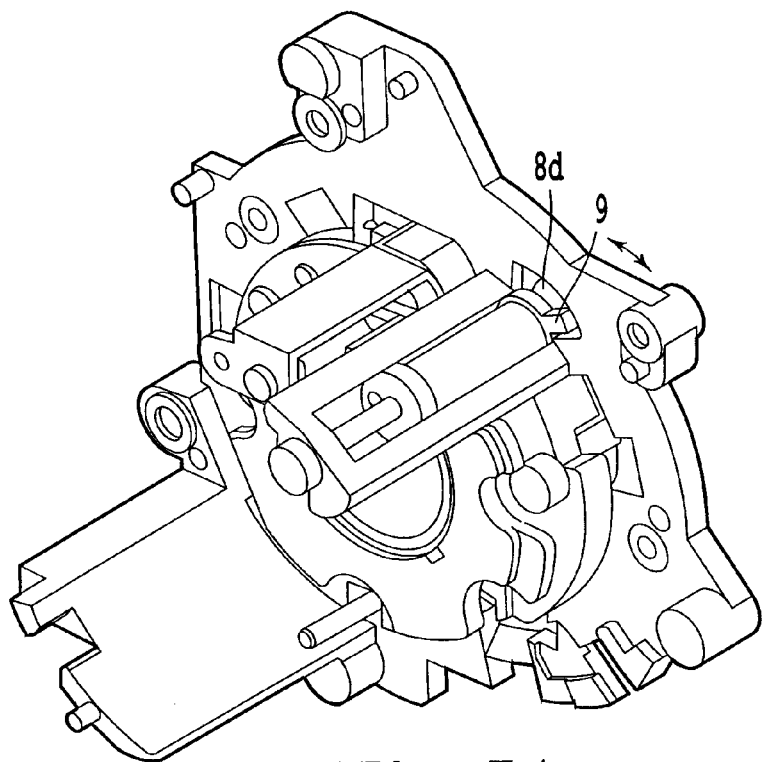
FIG. 5A and FIG. 5B are perspective views explanatory of the constructed state of the lens holder in accordance with the embodiment.
Figure 5B:
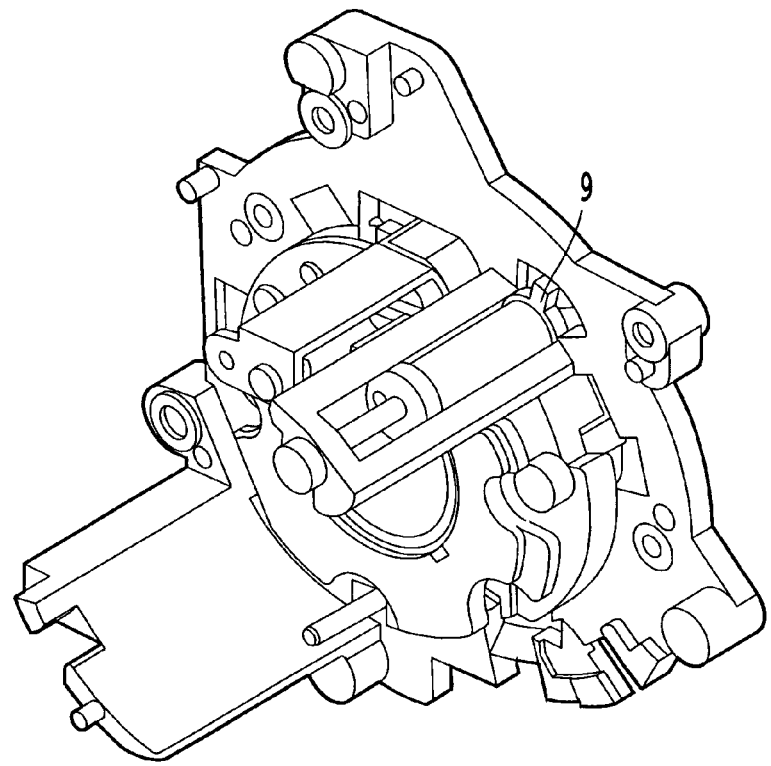

Next, the first example of a lens holder in accordance with the present embodiment will be described below. FIG. 4 is an exploded perspective view explanatory of the lens holder of the first example. FIG. 5A and FIG. 5B are perspective views for explaining the constructed state of the lens holder of the first example. FIG. 6A to FIG. 6D are front views explanatory of the lens holder of the first example.

The lens holder of the first example comprises a first bearing member 91 molded as an integral part of a rear barrel part 8 in order to bear the distal end of a guide shaft 14 (end distal to the rear barrel part 8), and a guide shaft presser 9 serving as a second bearing member that positions the proximal end of the guide shaft 14 (end proximal to the rear barrel part 8).

The first bearing member 91 comprises two supports 91a extending from the rear barrel part 8, and a bearing 91b held by the supports 91a. Since the bearing 91b is held by the supports 91a, the bearing 91b becomes strong enough to bear the guide shaft 14. In the first example, the two supports 91a are used to hold the bearing 91b. Alternatively, three or more supports 91a may be used to hold the bearing 91b. Moreover, one support 91a may be used to hold the bearing 91b.

The rear barrel part 8 comprises positioning members 8c that position positioning projections 9e of the guide shaft presser 9, and a locking member 8d that locks a locking projection 9f of the guide shaft presser 9. The guide shaft presser 9 comprises a bearing 9b that highly precisely cramps the guide shaft 14 in cooperation with the first bearing member 91 fixed to the rear barrel part 8, the positioning projections 9e being positioned by the positioning members 8c of the rear barrel part 8, and the locking projection 9f being locked by the locking member 8d of the rear barrel part 8.

Figure 6A:
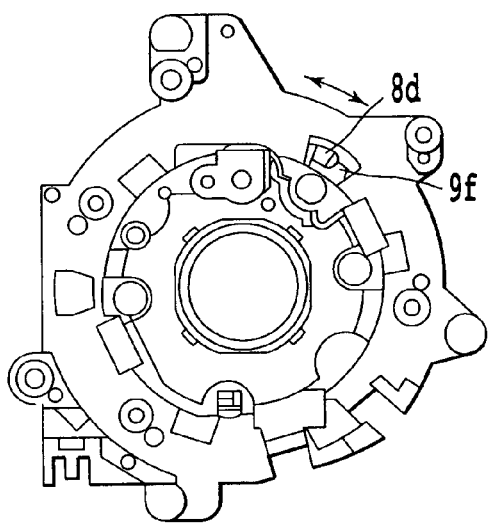
FIG. 6A to FIG. 6D are front views explanatory of the lens holder in accordance with the embodiment.
Figure 6B:
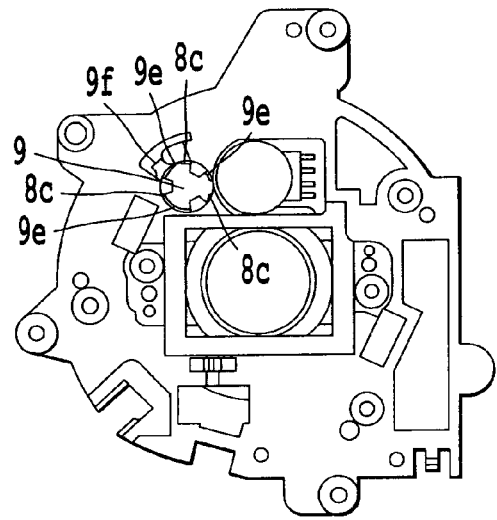

The guide shaft presser 9 is, as shown in FIG. 5A, FIG. 6A, and FIG. 6B, tentatively incorporated with the guide shaft 14 positioned. FIG. 5A is a perspective view showing the guide shaft presser tentatively incorporated. FIG. 6B is a front view showing the face of the rear barrel part having the guide shaft presser tentatively incorporated therein. FIG. 6B is a back view showing the back of the rear barrel part having the guide shaft presser tentatively incorporated therein. In this state, as shown in FIG. 6B, the positioning projections 9e are fitted in the positioning members 8c with a clearance between each pair of them. The guide shaft presser can be rotated with a small frictional resistance induced.

Figure 6C:
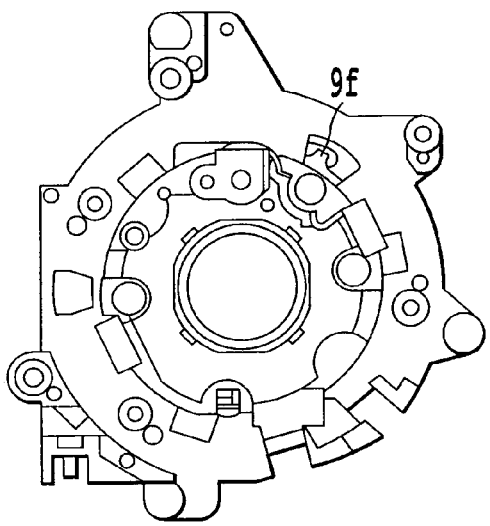
Figure 6D:
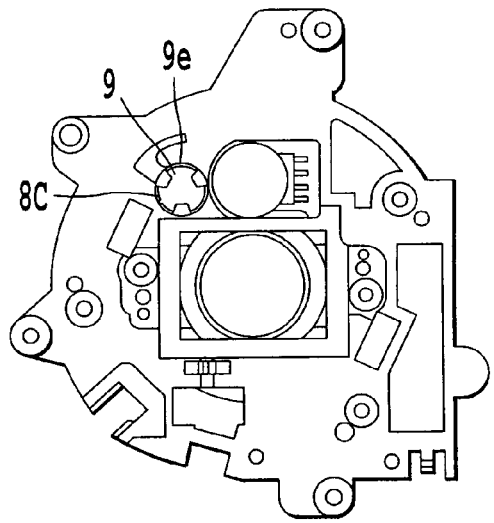

Thereafter, the guide shaft presser 9 is rotated (see arrow A in FIG. 6A). As shown in FIG. 5B, FIG. 6C, and FIG. 6D, the locking projection 9f is locked in the locking member 8d according to a very simple method such as a snap fit method (press fit accompanied by rotation of one or less turn). Consequently, the positioning projections 9e are, as shown in FIG. 6D, positioned by the positioning members 8c. Thus, the guide shaft presser 9 is locked with a frictional resistance induced to such an extent that the guide shaft presser will not readily come off with application of an external force such as an impact load. FIG. 5B is a perspective view showing the constructed state of the rear barrel part. FIG. 6C is a front view showing the face of the rear barrel part in the constructed state. FIG. 6B is a back view showing the back of the rear barrel part in the constructed state. Incidentally, positioning can be achieved irrespective of whatever means is adopted for snap fit or pressure fit.

Since the lens holder of the first example has the foregoing construction, the distal end of the guide shaft 14 is positioned by the first bearing member 91 molded as an integral part of the rear barrel part 8, and the proximal end of the guide shaft 14 is positioned by the guide shaft presser 9. This obviates the necessity of a means for restricting the turnover of the guide shaft presser 9. The guide shaft 14 can be readily and highly precisely aligned with the optical axis. Consequently, the lens holder becomes compact without degradation of precision in positioning the guide shaft 14.

Moreover, since the distal end (end distal to the rear barrel part 8) of the guide shaft 14 is positioned by the first bearing member 91 molded as an integral part of the rear barrel part 8, the precision in the position of the third group frame 7 moved away from the rear barrel part 8 is improved greatly. In particular, the precision in focusing to be performed at a near distance at which focusing is very severe is improved. Moreover, one-side blur occurring at a near distance (at a very close position) can be suppressed readily.

If a means is included for positioning or locking the guide shaft presser 9 directly in the rear barrel part 8, attaching screws and other securing pieces become unnecessary. The object of realizing a compact low-cost design can be accomplished while the guide shaft 14 is highly precisely aligned with the optical axis. Since the internal structure of a collapsible lens barrel or a collapsible camera has become compact and low-cost, a compact low-cost collapsible lens barrel or collapsible camera can be realized.

Figure 7:
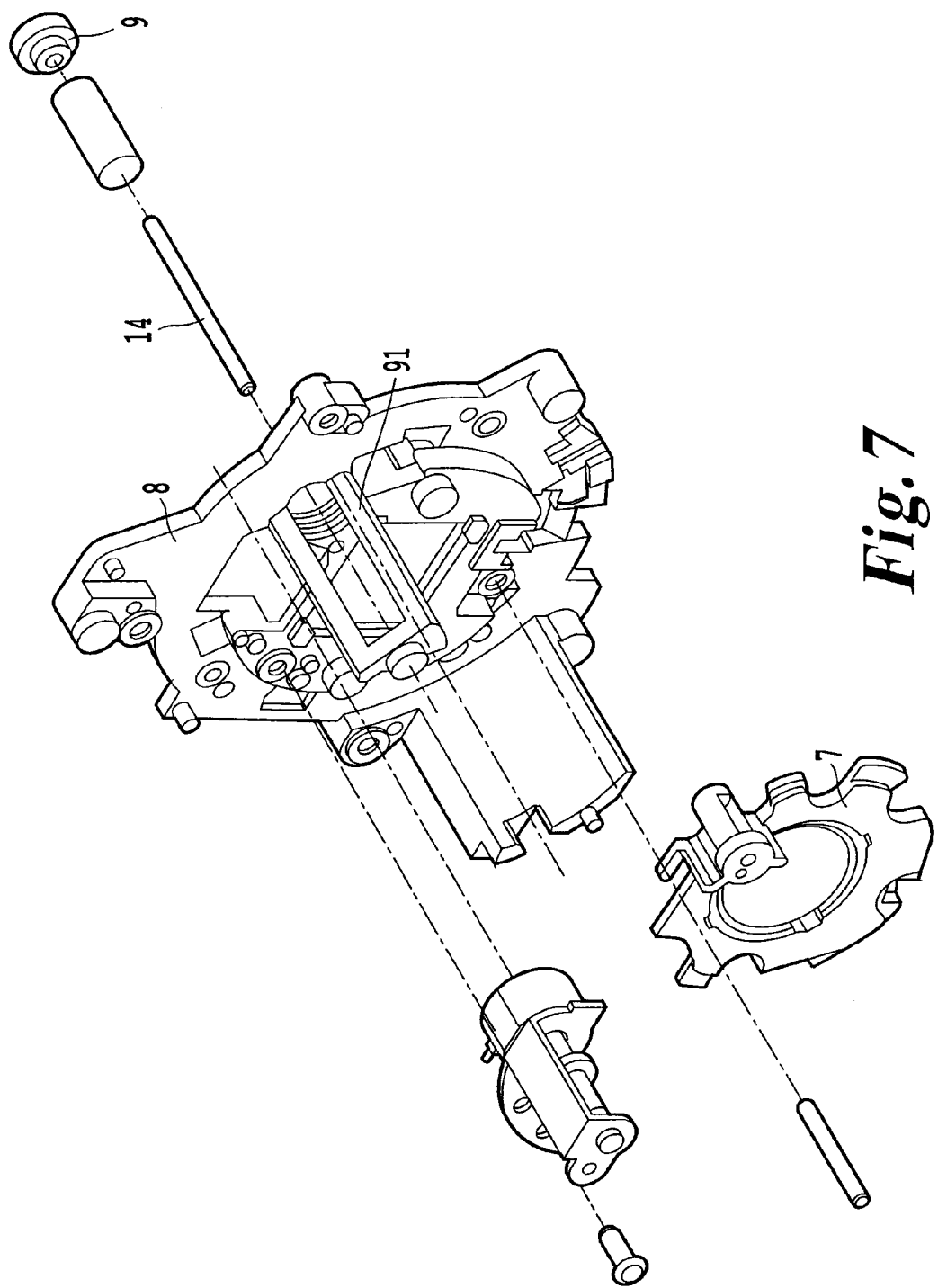
FIG. 7 is an exploded perspective view explanatory of a second example of a lens holder.

Next, the second example will be described below. FIG. 7 is an exploded perspective view explanatory of the second example of a lens holder. Specifically, the lens holder comprises, similarly to the first example, a first bearing member 91 molded as an integral part of a rear barrel part 8 in order to bear the distal end of a guide shaft 14, and a guide shaft presser 9 that positions the proximal end of the guide shaft 14. However, the second example is different from the first example in a point that the guide shaft presser 9 is screwed to the rear barrel part 8 and thus locked therein.

To be more specific, the distal end of the guide shaft 14 is positioned by the first bearing member 91 while being passed through a third group frame 7. In this state, the proximal end of the guide shaft 14 is fitted into a bearing 9b of the guide shaft presser 9. The periphery of the guide shaft presser 9 is threaded in advance so that it can be meshed with a screw threaded in the internal surface of a hole bored in the rear barrel part 8.

Since the guide shaft presser 9 is screwed to the rear barrel part 8, the guide shaft 14 can be highly precisely cramped in cooperation with the first bearing member 91. Furthermore, if a fitting or the like is disposed ahead of and behind the screw, the guide shaft 14 can be further highly precisely cramped. Moreover, when the guide shaft presser 9 is screwed to the rear barrel part 8, the guide shaft presser can be reliably locked without the use of another securing piece.

Figure 8:
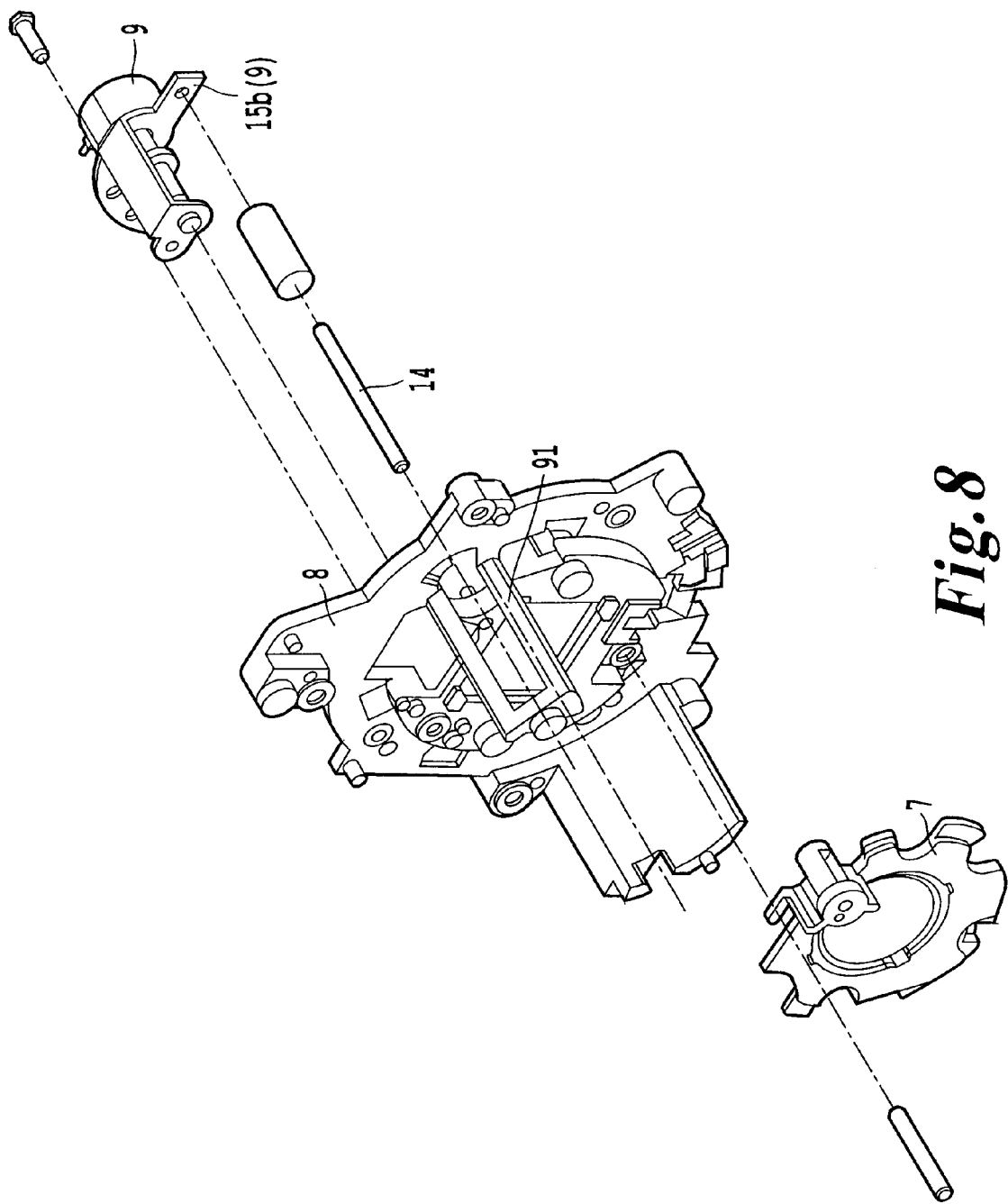
FIG. 8 is an exploded perspective view explanatory of a third example of a lens holder.

Next, the third example will be described below. FIG. 8 is an exploded perspective view explanatory of the third example of a lens holder. Specifically, the lens holder includes, similarly to the first example, a first bearing member 91 molded as an integral part of a rear barrel part 8 in order to bear the distal end of a guide shaft 14. However, the third example is different from the first example in a point that a guide shaft presser 9 which bears the proximal end of the guide shaft 14 also serves as a mounting plate 15*b* for use in mounting a stepping motor 15 that is a drive source.

To be more specific, in the third example, the stepping motor 15 is mounted on the back of the rear barrel part 8, and the mounting plate 15*b* for mounting the stepping motor 15 is partly extended in order to realize the guide shaft presser 9.

For assembling, the guide shaft 14 is passed through a third group frame 7 and the distal end of the guide shaft 14 is positioned using the first bearing member 91. In this state, the stepping motor 15 is fixed to the rear barrel part 8 with the mounting plate 15*b* between them. The extension of the mounting plate 15*b* is used as the guide shaft presser 9 to bear the proximal end of the guide shaft 14.

The guide shaft presser 9 that is the extension of the mounting plate 15*b* has a concave part with which the guide shaft presser bears the proximal end of the guide shaft 14. The proximal end of the guide shaft 14 is fitted in the concave part. The concave part may be a through hole or a dent. If the concave part is a through hole, the proximal end of the guide shaft 14 is tapered or stepped for fear the guide shaft 14 may come off from the through hole.

As mentioned above, since the mounting plate 15*b* for use in mounting the stepping motor 15 also serves as the guide shaft presser 9, the number of parts or the man hours required for assembling the parts can be reduced.

Figure 9:
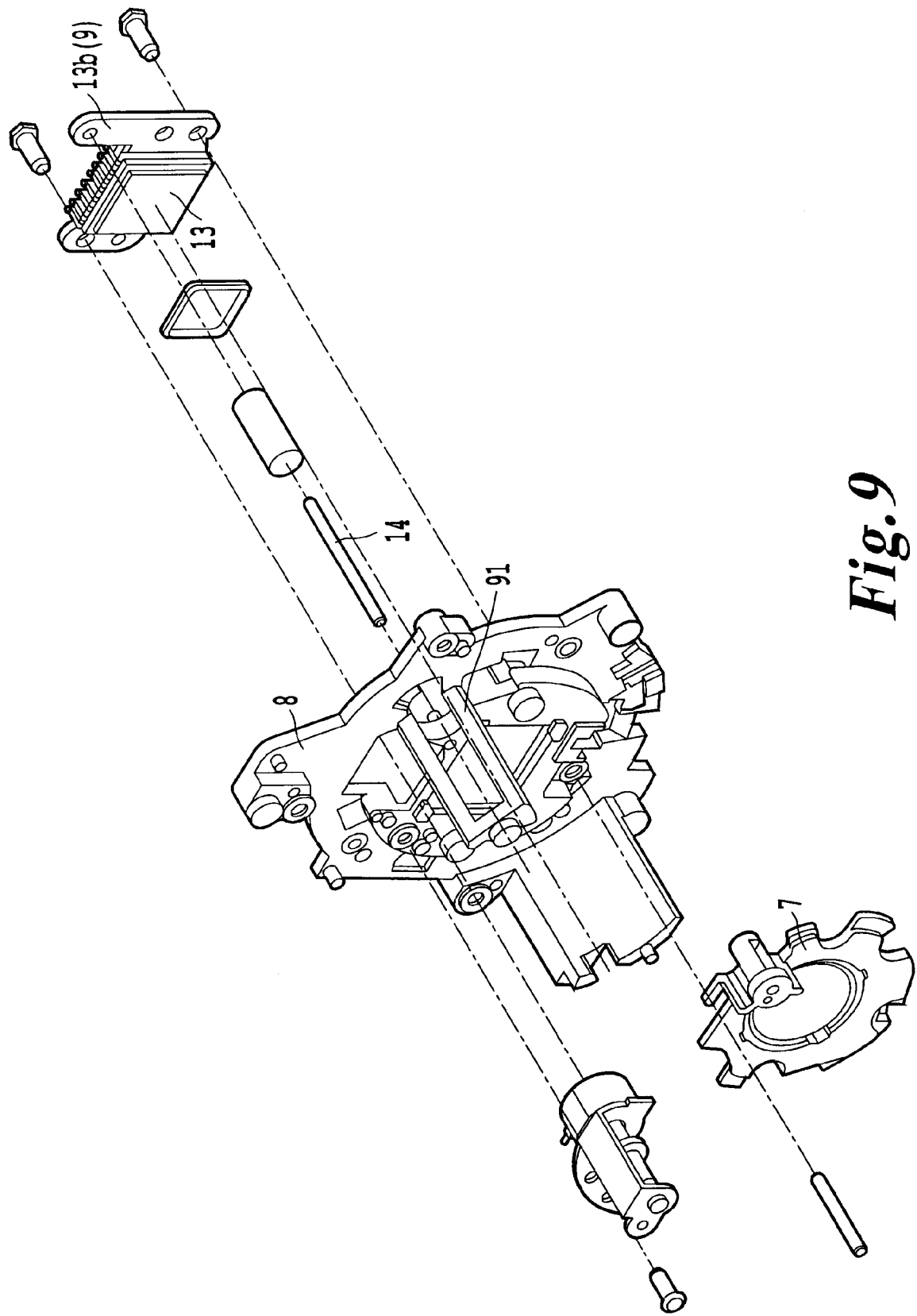
FIG. 9 is an exploded perspective view explanatory of a fourth example of a lens holder.

Next, the fourth example will be described below. FIG. 9 is an exploded perspective view explanatory of the fourth example of a lens holder. Specifically, the lens holder includes, similarly to the first example, a first bearing member 91 molded as an integral part of a rear barrel part 8 in order to bear the distal end of a guide shaft 14. However, the fourth example is different from the first example in a point that a guide shaft presser 9 for bearing the proximal end of the guide shaft 14 also serves as a mounting plate 13*b* for use in mounting a solid-state imaging device 13.

To be more specific, in the fourth example, the solid-state imaging device 13 is mounted on the back of the rear barrel part 8, and the mounting plate 13 for use in mounting the solid-state imaging device 13 is partly extended in order to realize the guide shaft presser 9.

For assembling, the guide shaft 14 is passed through a third group frame 7, and the distal end of the guide shaft 14 is positioned using the first bearing member 91. In this state, the solid-state imaging device 13 is fixed to the rear barrel part 8 with the mounting plate 13*b* between them, and the extension of the mounting plate 13*b* is used as the guide shaft presser 9 to bear the proximal end of the guide shaft 14.

The guide shaft presser 9 that is the extension of the mounting plate 13*b* has a concave part that bears the proximal end of the guide shaft 14 in the same manner as the one included in the foregoing example. The proximal end of the guide shaft 14 is fitted in the concave part and thus positioned. The concave part may be a through hole or a dent. If the concave part is a through hole, the proximal end of the guide shaft 14 is tapered or stepped for fear the guide shaft 14 may come off from the through hole.

As mentioned above, since the mounting plate 13*b* for mounting the solid-state imaging device 13 also serves as the guide shaft presser 9, the number of parts or the man hours required for assembling the parts can be reduced.

Figure 10:
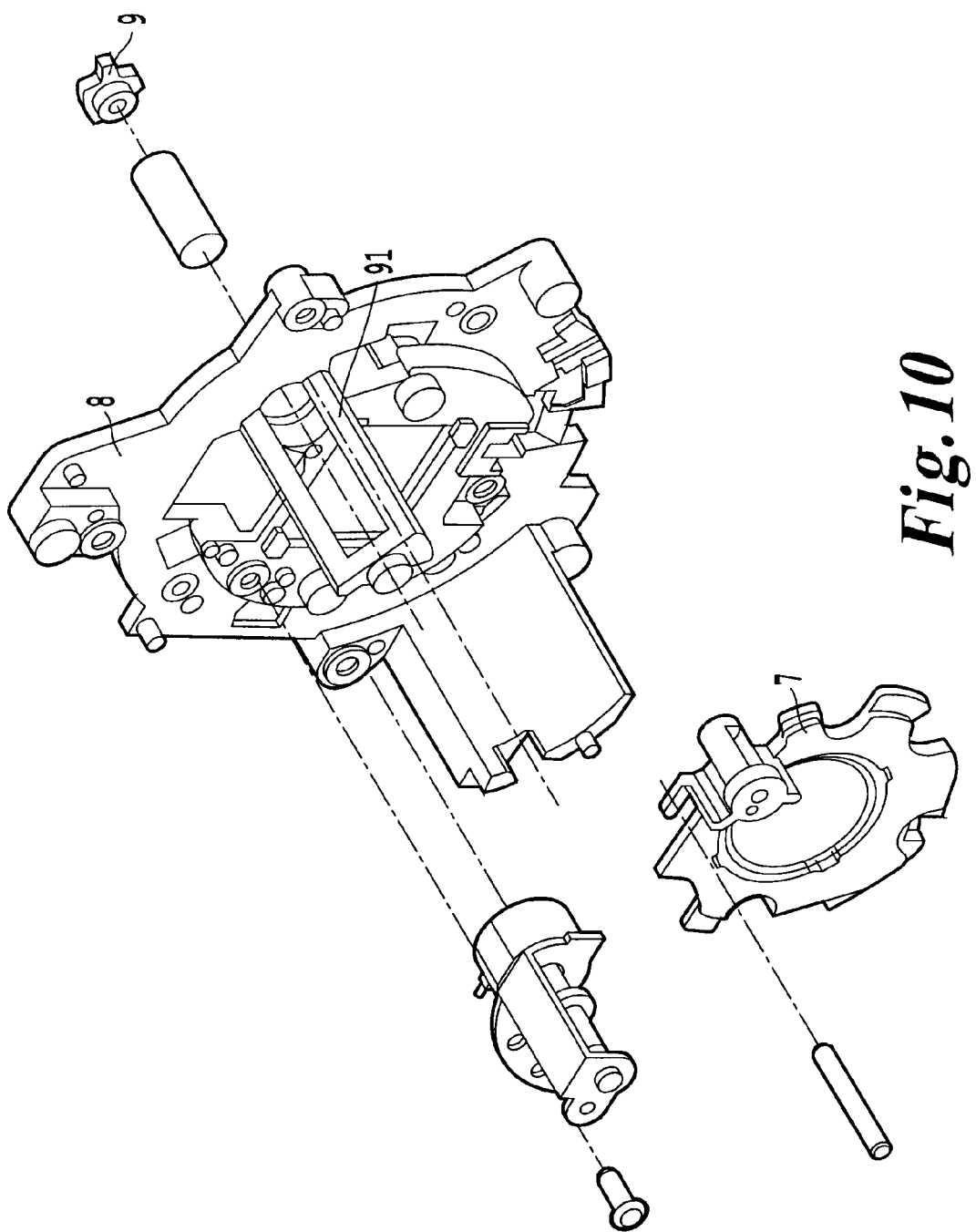
FIG. 10 is an exploded perspective view explanatory of a fifth example of a lens holder.

Next, the fifth example will be described below. FIG. 10 is an exploded perspective view explanatory of the fifth example of a lens holder. Specifically, the lens holder comprises, similarly to the first embodiment, a first bearing member 91 molded as an integral part of a rear barrel part 8 in order to bear the distal end of a guide shaft 14, and a guide shaft presser 9 that positions the proximal end of the guide shaft 14. However, the fifth example is different from the first example in a point that the guide shaft 14 is molded as an integral part of the first bearing member 91 (that is, the rear barrel part 8).

To be more specific, in the fifth example, when the rear barrel part 8 is molded, the first bearing member 91 is molded as an integral part of the rear barrel part 8 with the distal end of the guide shaft 14 positioned in the first bearing member 91.

For assembling, since the guide shaft 14 is already joined to the first bearing member 91, after the guide shaft 14 is passed through a third group frame 7, the guide shaft presser 9 is attached in order to bear the proximal end of the guide shaft 14. The structure of the guide shaft presser 9 may be of a snap fit type similarly to the one included in the first example, or may be of a screwed type similarly to the one included in the second example. Moreover, the structure of the guide shaft presser 9 may be of a type that also serves as the mounting plate 15*b* for mounting the stepping motor 15 similarly to the one included in the fourth example, or may be of a type that also serves as the mounting plate 13*b* for mounting the solid-state imaging device 13 similarly to the one included in the fourth example.

Owing to the foregoing construction, since the guide shaft 14 is not a separate part, the number of parts is reduced. For assembling, since the guide shaft 14 is already locked, it can be readily and accurately positioned.

Figure 11:
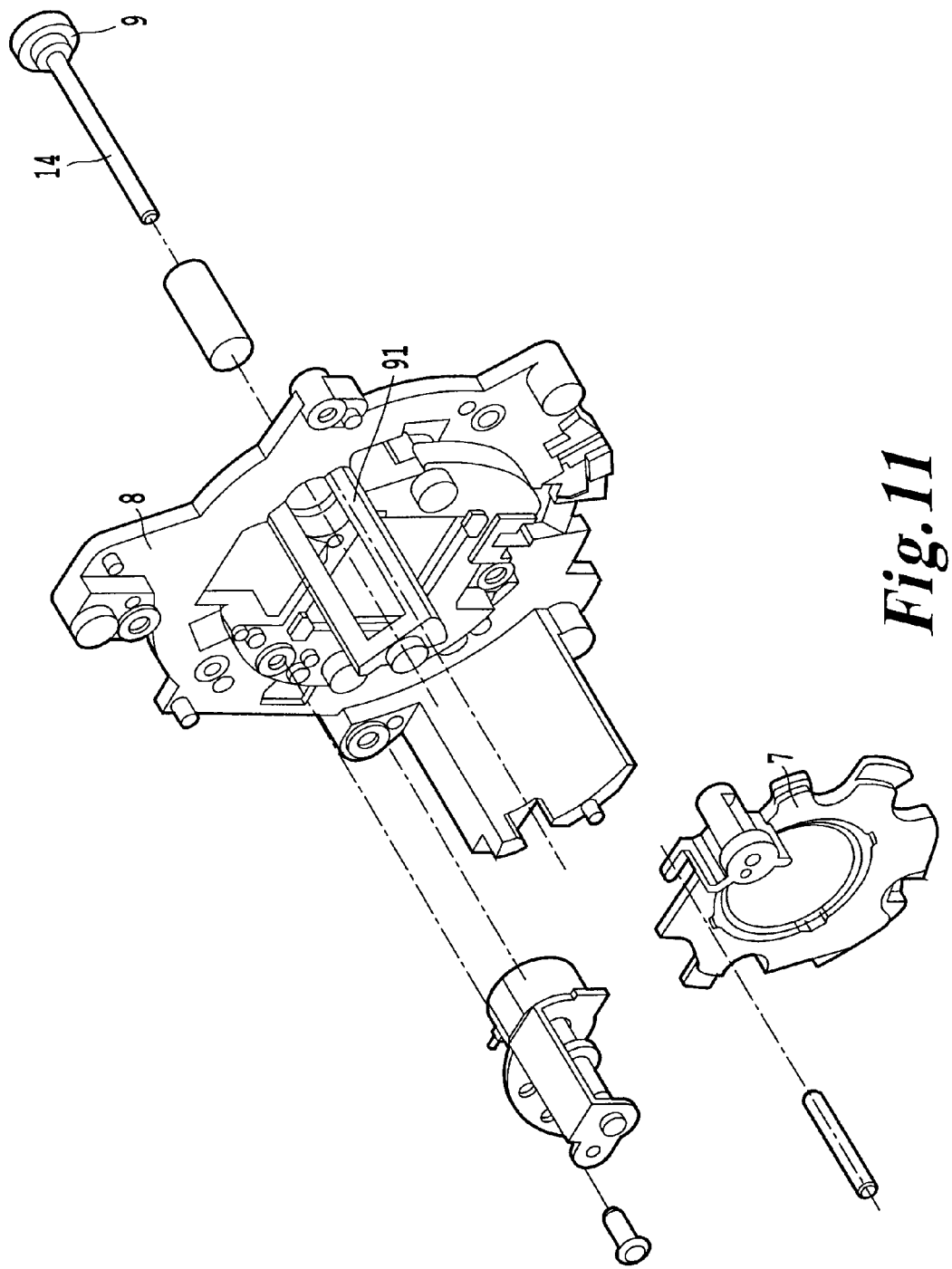
FIG. 11 is an exploded perspective view explanatory of a sixth example of a lens holder.

Next, the sixth example will be described below. FIG. 11 is an exploded perspective view explanatory of the sixth example of a lens holder. Specifically, the lens holder comprises, similarly to the first example, a first bearing member 91 molded as an integral part of a rear barrel part 8 in order to bear the distal end of a guide shaft 14, and a guide shaft presser 9 that positions the proximal end of the guide shaft 14. However, the sixth example is different from the first example in a point that the guide shaft 14 is molded as an integral part of the guide shaft presser 9.

To be more specific, in the sixth example, when the guide shaft presser 9 is molded, the proximal end of the guide shaft 14 is positioned in the center of the guide shaft presser 9.

For assembling, the guide shaft 14 is passed through a third group frame 7, and the distal end of the guide shaft 14 is positioned using the first bearing member 91. In this state, the guide shaft presser 9 attached to the proximal end of the guide shaft 14 is locked in the rear barrel part 8. The structure for locking the guide shaft presser 9 may be of a snap fit type like the one employed in the first example or may be of a screwed type like the one employed in the second example.

Owing to the foregoing construction, since the guide shaft 14 is not a separate part, the number of parts is reduced. Moreover, during assembling, since the guide shaft 14 is fixed to the guide shaft presser 9 in advance, the guide shaft can be readily and accurately positioned.

Figure 12:
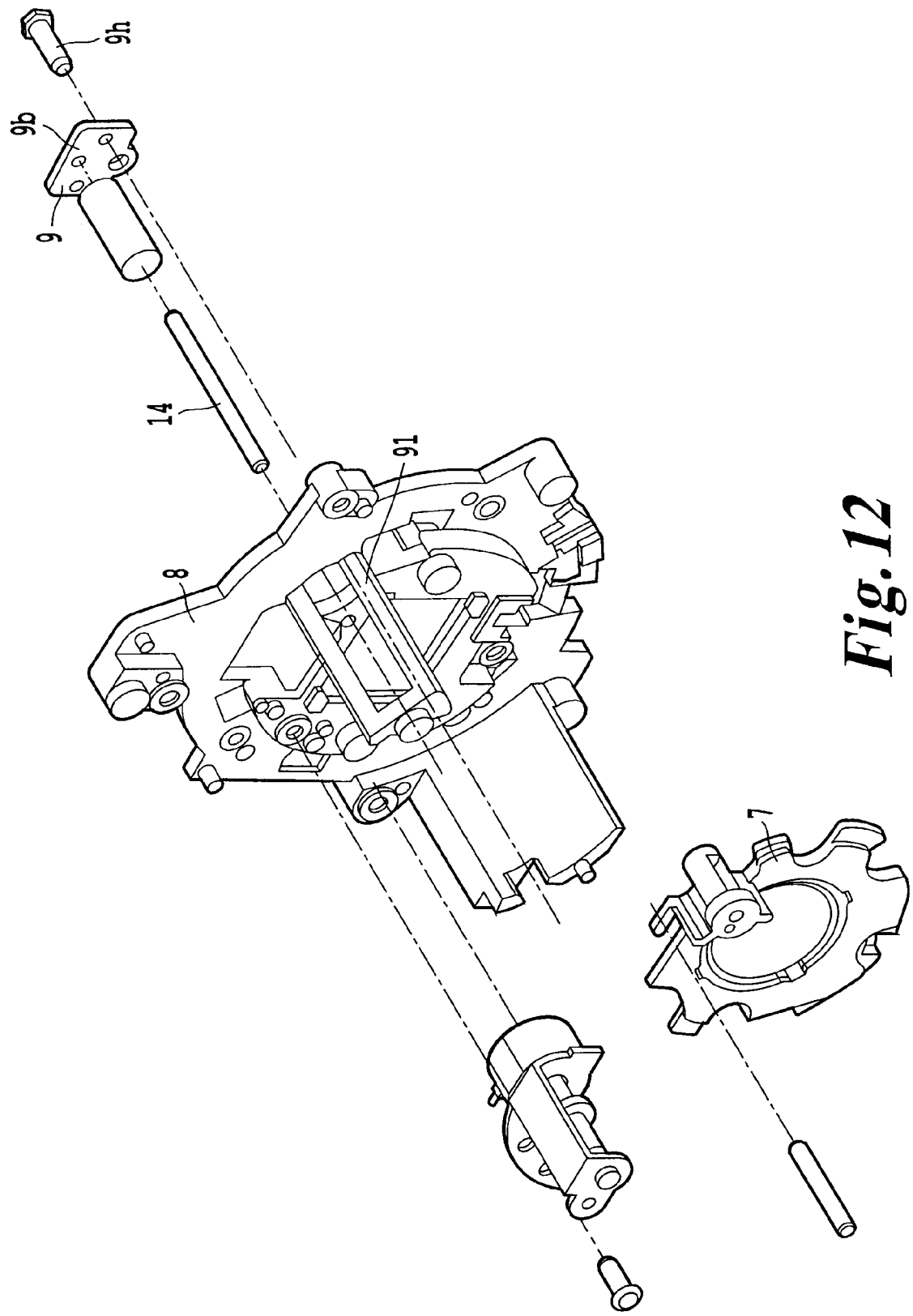
FIG. 12 is an exploded perspective view explanatory of a seventh example of a lens holder.

Next, the seventh example will be described below. FIG. 12 is an exploded perspective view explanatory of the seventh example of a lens holder. Specifically, the lens holder comprises, similarly to the first example, a first bearing member 91 molded as an integral part of a rear barrel part 8 in order to bear the distal end of a guide shaft 14, and a guide shaft presser 9 for use in positioning the proximal end of the guide shaft 14. However, the seventh example is different from the first example in a point that the guide shaft presser 9 is formed with a metallic plate and screwed to the rear barrel part 8.

For assembling, the guide shaft 14 is passed through a third group frame 7, and the distal end of the guide shaft 14 is positioned using the first bearing member 91. In this state, the proximal end of the guide shaft 14 is fitted in a bearing 9b of the guide shaft presser 9. The guide shaft presser 9 is then secured to the rear barrel part 8 using a screw 9h. Since the guide shaft presser 9 is formed with a metallic plate and is secured using the screw 9h, the guide shaft presser can support the guide shaft 14 very strongly.

Figure 13A:
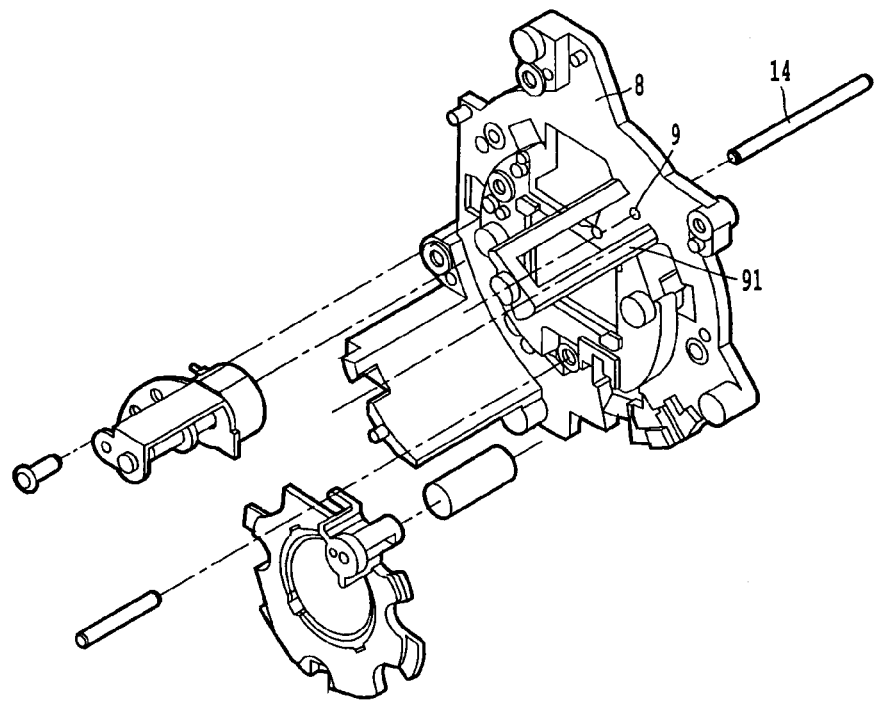
FIG. 13A to FIG. 13C are perspective views explanatory of an eighth example of a lens holder.
Figure 13B:
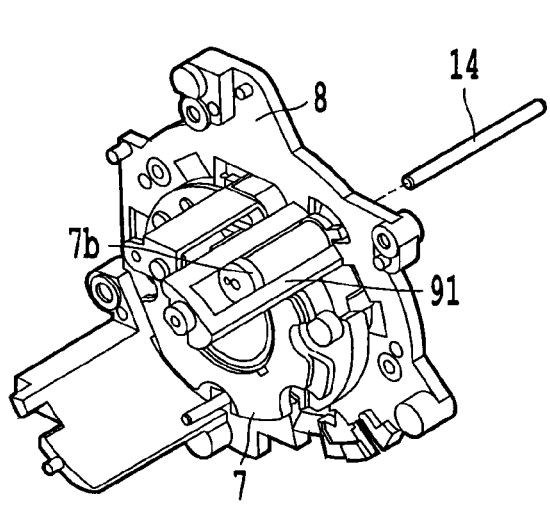
Figure 13C:
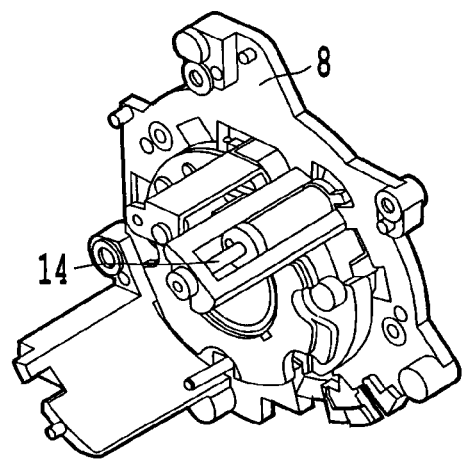

Next, the eighth example will be described below. FIG. 13A to FIG. 13C are perspective views explanatory of the eighth example of a lens holder. FIG. 13A is an exploded perspective view, and FIG. 13B and FIG. 13C are perspective views explanatory of assembling. Specifically, the lens holder includes, similarly to the first example, a first bearing member 91 molded as an integral part of a rear barrel part 8 in order to bear the distal end of the guide shaft 14. However, the eighth example is different from the first example in a point that a guide shaft presser 9 for use in bearing the proximal end of the guide shaft 14 is molded as an integral part of the rear barrel part 8.

To be more specific, a hole whose diameter is nearly the same as the diameter of the guide shaft 14 is bored in a portion of the rear barrel part 8 in which the proximal end of the guide shaft 14 is positioned. The hole serves as the guide shaft presser 9.

For assembling, as shown in FIG. 13B, a sleeve 7b of a third group frame 7 through which the guide shaft 14 is passed is inserted in the first bearing member 91. In this state, the guide shaft 14 is pressed and fitted into the hole from the back or face of the rear barrel part 8. The guide shaft 14 is passed through the sleeve 7b of the third group frame 7 and brought into contact with the first bearing member 91. This leads to the state shown in FIG. 13B. After the guide shaft 14 is pressed and fitted into the rear barrel part 8, the proximal end of the guide shaft 14 may be secured using an adhesive or through deposition.

Owing to the foregoing construction, since the guide shaft presser 9 need not be prepared separately, the number of parts is reduced. Moreover, the precision in positioning the proximal end of the guide shaft 14 is determined with the position of the hole bored in the rear barrel part 8. Consequently, the guide shaft 14 can be supported highly precisely.

Incidentally, when a lens barrel (collapsible lens barrel) including any of the aforesaid lens holders is adapted to an imaging apparatus such as a digital still camera, the lens holder contributes to the compact design of the imaging apparatus.

INDUSTRIAL APPLICABILITY

As described so far, the present invention provides advantages described below. Namely, the end of a guide shaft is positioned using a first bearing member molded as an integral part of a rear barrel part, and the proximal end of the guide shaft is positioned using a guide shaft presser. This obviates the necessity of a means for restricting the turnover of the guide shaft presser. The guide shaft can be readily and highly precisely aligned with the optical axis. Consequently, a compact design can be attained without degradation of the precision in positioning the guide shaft.

Moreover, since the internal structure of a collapsible lens barrel or an imaging apparatus (collapsible camera) having the collapsible lens barrel can be designed to be compact and low-cost, the collapsible lens barrel or collapsible camera can be designed to be compact and low-cost.

The invention claimed is:

1. A lens holder comprising:
   a holding member configured to hold lenses;
   a guide shaft configured to support the holding member when the holding member is moved along the optical axis of the lenses;
   a base perpendicularly to which the guide shaft is locked;
   a first bearing member that is molded as an integral part of the base in order to bear the end of the guide shaft distal to the base;
   a second bearing member that when the first bearing member bears the end of the guide shaft distal to the base, bears the end of the guide shaft proximal to the base,
   wherein the lens holder is a rear barrel part of a collapsible lens barrel.

2. The lens holder according to claim 1, wherein the first bearing member comprises a bearing that is disposed to bear the end of the guide shaft distal to the base, and a support that links the base and the bearing.

3. The lens holder according to claim 1, wherein the second bearing member configured to be locked in the base by rotating the second bearing member one or less turn with the guide shaft as a center while bearing the end of the guide shaft proximal to the base.

4. The lens holder according to claim 1, wherein the second bearing member is screwed to the base and thus locked in the base.

5. The lens holder according to claim 1, wherein the second bearing member also serves as a mounting member for use in mounting a part on the side of the base opposite to the side thereof on which the guide shaft is mounted.

6. The lens holder according to claim 1, wherein the second bearing member is molded as an integral part of the base.

7. A lens barrel including the lens holder set forth in claim 1.

8. An imaging apparatus comprising:
   a lens barrel including the lens holder set forth in claim 1; and
   an imaging device configured to convert an image, which is picked up through the lenses incorporated in the lens barrel, into an electrical signal.

* * * * *